US008738043B2

(12) United States Patent
Cha et al.

(10) Patent No.: US 8,738,043 B2
(45) Date of Patent: May 27, 2014

(54) APPARATUS AND METHOD FOR CONSTRUCTING WIRELESS AP MAP

(75) Inventors: Hojung Cha, Seoul (KR); Jahyoung Koo, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 207 days.

(21) Appl. No.: 13/276,517

(22) Filed: Oct. 19, 2011

(65) Prior Publication Data

US 2012/0225678 A1   Sep. 6, 2012

(30) Foreign Application Priority Data

Mar. 3, 2011   (KR) .................. 10-2011-0018888

(51) Int. Cl.
*H04W 24/00* (2009.01)
*H04W 40/00* (2009.01)
*H04W 4/00* (2009.01)

(52) U.S. Cl.
USPC ............... 455/457; 455/456.1; 455/456.5; 455/446; 370/328

(58) Field of Classification Search
USPC ............. 455/456.1–457, 446; 370/338, 328
See application file for complete search history.

(56) References Cited

U.S. PATENT DOCUMENTS

| 6,788,945 | B1* | 9/2004 | Echols et al. ............. 455/456.5 |
| 2006/0146754 | A1* | 7/2006 | Bejerano ..................... 370/332 |
| 2008/0125161 | A1* | 5/2008 | Ergen et al. .................. 455/524 |
| 2010/0265093 | A1 | 10/2010 | Cho et al. |

FOREIGN PATENT DOCUMENTS

| KR | 10-2009-0059920 A | 6/2009 |
| KR | 10-2010-0121903 A | 11/2010 |

* cited by examiner

*Primary Examiner* — Wesley Kim
*Assistant Examiner* — Nam Huynh
(74) *Attorney, Agent, or Firm* — Edwards Wildman Palmer LLP

(57) ABSTRACT

An apparatus and a method for constructing a wireless AP map are disclosed. An embodiment of the invention provides a method for constructing a wireless AP map at a server connected over a network with a user terminal that includes: receiving wireless signal information collected from each of a plurality of user terminals, where the wireless signal information includes a signal strength of each of a plurality of wireless AP's received by each user terminal; estimating a distance of each of the plurality of wireless AP's by using the wireless signal information; and constructing a wireless AP map by using the estimated distances. Thus, a wireless AP map can be constructed using wireless signal information collected at typical user terminals located within a particular area, without requiring a trained person to recognize the wireless AP positions within the particular area.

13 Claims, 8 Drawing Sheets

APPARATUS AND METHOD FOR CONSTRUCTING WIRELESS AP MAP

CROSS-REFERENCE TO RELATED APPLICATION

This application claims under 35 U.S.C. §119(a) the benefit of Korean Application No. 10-2011-0018888 filed Mar. 3, 2011, the entire contents of which application are incorporated herein by reference.

TECHNICAL FIELD

The present invention relates to an apparatus and a method for constructing a wireless AP map, more particularly to an apparatus and a method for constructing a wireless AP map using wireless signal information received from a user terminal.

BACKGROUND ART

The position information of wireless AP's may be used as basic information for constructing a wireless positioning system or may by itself be used to recognize the characteristics of a wireless network.

The most basic approach to recognizing the positions of wireless AP's is to have a well-trained person travel to all of the places that can be visited and store the positions where wireless signals are received, and afterwards analyze the positions of wireless AP's by using the stored reception positions for wireless signals. This approach, however, may be difficult to employ for a network having a large coverage area.

Moreover, storing the wireless signals together with the positions when collecting wireless signals can require a lot of effort. To reduce the need for such effort, recent studies have employed inertial sensors to automatically generate positions where wireless signals are receivable.

However, the method of using an inertial sensor to recognize a position where a person is moving may require high precision sensors for accurate position recognition, and may entail the problem of position errors being accumulated over time.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

To resolve the problems above, an objective of the invention is to provide an apparatus and a method for constructing a wireless AP map that enables accurate recognition of wireless AP positions by using typical user terminals.

Other objectives of the present invention may be deduced by the skilled person from the embodiments described herein.

To achieve the objective above, a preferred embodiment of the invention provides a method for constructing a wireless AP map.

Another embodiment of the invention provides a method for constructing a wireless AP map at a server connected over a network with a user terminal that includes: receiving wireless signal information collected from each of a plurality of user terminals, where the wireless signal information includes a signal strength of each of a plurality of wireless AP's received by each user terminal; estimating a distance of each of the plurality of wireless AP's by using the wireless signal information; and constructing a wireless AP map by using the estimated distances.

Estimating the distance can include: selecting a first wireless AP and a second wireless AP from among the plurality of wireless AP's; and selecting wireless signal information for estimating a distance between the selected first wireless AP and the second wireless AP from among the wireless signal information and using the selected wireless signal information to estimate the distance between the first wireless AP and the second wireless AP.

Estimating the distance between the first wireless AP and the second wireless AP can include: selecting wireless signal information for a first user terminal from among the plurality of user terminals, where the first user terminal has a largest value of received signal strength from the first wireless AP or the second wireless AP; estimating a first distance between the first user terminal and the first wireless AP by using a signal strength from the first wireless AP included in wireless signal information of the first user terminal; estimating a second distance between the first user terminal and the second wireless AP by using a signal strength from the second wireless AP included in wireless signal information of the first user terminal; and estimating the distance between the first and second wireless AP's by using the first distance and the second distance.

Estimating the first distance can include assuming that the first wireless AP is positioned on a first circle having the first distance as a radius and the first user terminal as a center to estimate the first distance, while estimating the second distance can include assuming that the second wireless AP is positioned on a second circle having the second distance as a radius and the first user terminal as a center to estimate the second distance.

Estimating the distance between the first and second wireless AP's can include: determining the estimated distance between the first and second wireless AP's to be an average of distances between the first and the second wireless AP's at all points at which the first and the second wireless AP can be positioned on the first and the second circles.

The estimated first distance and second distance can have smaller values for greater signal strengths from the first wireless AP and the second wireless AP.

A signal strength from the first wireless AP or the second wireless AP can be classified into a level according to section, and a distance preset for the level can be determined to be the first distance or the second distance.

The method can further include, if second wireless signal information including a signal strength greater than a signal strength from the first wireless AP or the second wireless AP included in first wireless signal information of the first user terminal is received, re-estimating the distance between the first wireless AP and the second wireless AP by using the second wireless signal information, and updating the wireless AP map by using the re-estimated distance.

The wireless AP map can be constructed in a 2-dimensional or a 3-dimensional form.

The wireless AP map can be constructed using MDS (multi-dimensional scaling).

If the plurality of wireless AP's are positioned in a building having N stories (wherein N is a natural number), constructing the wireless AP map can include: extracting 3-dimensional coordinates (x, y, z) for each of the plurality of wireless AP's by applying MDS to the distances estimated between the plurality of wireless AP's, and constructing the wireless AP map in 3-dimensional space by using the 3-dimensional coordinates of each of the wireless AP's.

Constructing the wireless AP map can include: performing clustering into an N number of groups by using the z coordinates of the plurality of wireless AP's and applying 2-dimensional MDS for each of the N groups to reconstruct a wireless AP map in 2-dimensional space for each story.

Another embodiment of the invention provides a method for constructing a wireless AP map at a user terminal that includes: receiving wireless signal information collected from each of a plurality of user terminals that are connected over a network within a particular area, where the wireless signal information includes a signal strength of each of a plurality of wireless AP's received by each user terminal; estimating a distance of each of the plurality of wireless AP's by using the wireless signal information; and constructing a wireless AP map by using the estimated distances.

Yet another embodiment of the invention provides an apparatus for constructing a wireless AP map that includes: a wireless signal information receiver unit configured to receive wireless signal information collected from each of a plurality of user terminals, where the wireless signal information including a signal strength of each of a plurality of wireless AP's received by each user terminal; a distance estimator unit configured to estimate a distance of each of the plurality of wireless AP's by using the wireless signal information; and a wireless AP map constructor unit configured to construct a wireless AP map by using the estimated distances.

According to an aspect of the present invention, a wireless AP map can be constructed using wireless signal information collected at typical user terminals located within a particular area, without requiring a trained person to recognize the wireless AP positions within the particular area.

Also, according to an aspect of the invention, a wireless AP map can be constructed wherever user terminals are located, without spatial limitations.

Additional aspects and advantages of the present invention will be set forth in part in the description which follows, and in part will be obvious from the description, or may be learned by practice of the invention.

DETAILED DESCRIPTION OF THE DISCLOSURE

Figure 1:
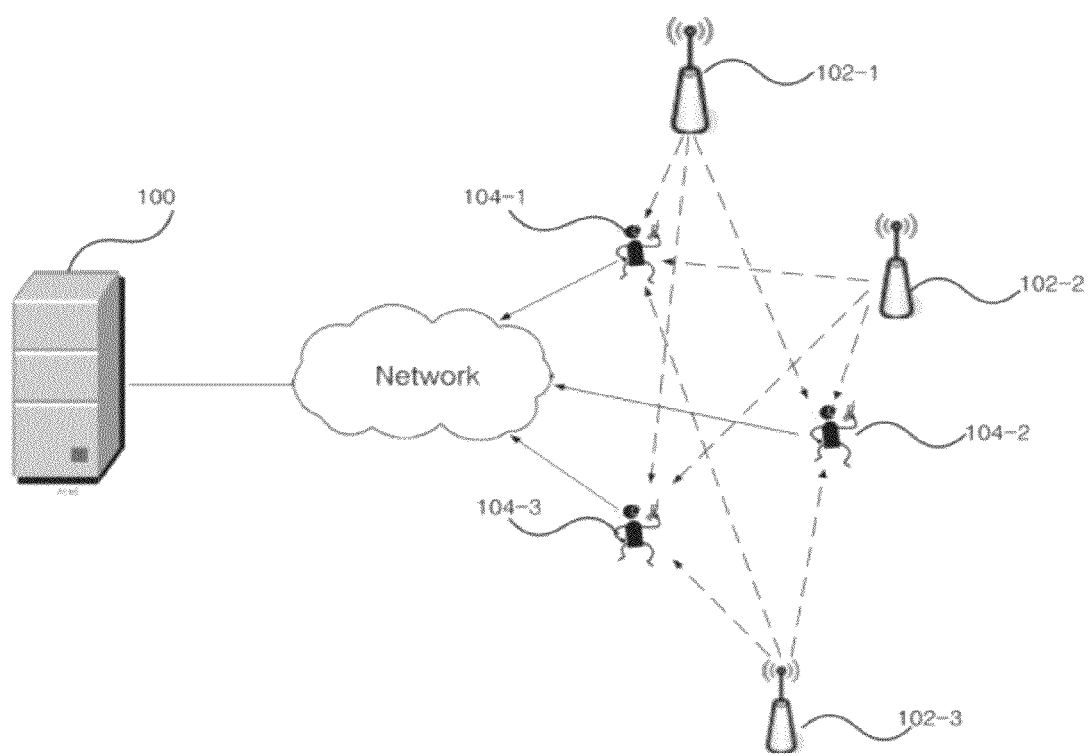
FIG. 1 illustrates a system for constructing a wireless AP map according to a preferred embodiment of the invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals refer to like elements.

Certain embodiment of the invention will be described below in more detail with reference to the accompanying drawings.

FIG. 1 illustrates a system for constructing a wireless AP map according to a preferred embodiment of the invention.

As illustrated in FIG. 1, a system for constructing a wireless AP map according to an embodiment of the invention can include a server 100, at least one or more wireless AP's 102, and at least one or more user terminals 104, and the user terminals 104 can be connected with the server over a network.

Here, the term network can encompass both wired networks, including the Internet and designated lines, and wireless networks, such as broadcast networks and satellite communication networks.

According to a preferred embodiment of the invention, a user terminal 104 can receive wireless signals from multiple wireless AP's 102 and transmit the collected wireless signal information to the server 100.

Here, a wireless AP 102 can be an access point for exchanging wireless signals with a user terminal 104 by using a near field communication protocol such as WiFi and Bluetooth. However, in addition to access points that use near field communication protocols, those that use far field communication protocols such as WiBro can be encompassed by the scope of the invention.

A user terminal 104 according to this embodiment may collect wireless signal information from the wireless AP's 102. The wireless signal information may include the signal strengths of wireless AP signals, and if there are multiple wireless AP's 102 in the vicinity of the user terminal 104, the wireless signal information may be collected simultaneously from the multiple wireless AP's 102.

According to an embodiment of the invention, the wireless signal information collected at a user terminal 104 can be expressed by the following Equation 1.

$$SCANi=(AP1,rss1),(AP2,rss2),\ldots,(APn,rssn) \quad \text{[Equation 1]}$$

Here, SCANi is the wireless signal information collected at the i-th user terminal, APn is the identification number of the n-th wireless AP, and rssn is the signal strength of the n-th wireless AP.

For a first user terminal 104-1 collecting wireless signal information from a first wireless AP 102-1, a second wireless AP 102-2, and a third wireless AP 102-3, the wireless signal information can be expressed, for example, as SCAN1=(AP1, −20 dBm), (AP2, −40 dBm), (AP3, −80 dBm).

Here, the user terminal 104 can encompass any terminal capable of communicating with a wireless network such as a smart phone, laptop, tablet PC, etc., equipped with a wireless module.

The server 100 may construct a wireless AP map by using the wireless signal information received from the user terminals 104. A wireless AP map refers to a position map formed by using the position information of wireless AP's existing within a particular area.

According to an embodiment of the invention, the server 100 can estimate the distances between wireless AP's 102 by using the wireless signal information received from the user terminals 104 and apply a statistical technique known as multi-dimensional scaling (MDS) to construct the wireless AP map.

Here, multi-dimensional scaling refers to a method of statistical analysis in which a few property variables are measured for an n number of objects, before using these variables to measure the distances or dissimilarities between the objects, and using these to express the objects in 2-dimensional or 3-dimensional space.

For example, if there are three objects, O1, O2, and O3, the perception distance between O1 and O2 being d12, the perception distance between O2 and O3 being d23, and the perception distance between O1 and O3 being d13, then this information can be applied in multi-dimensional scaling to yield 2-dimensional coordinates (x1, y1), (x2, y2), and (x3, y3) for the objects. Multi-dimensional scaling is well known in the art and thus will not be described in further detail.

A server 100 according to this embodiment may estimate the distances between all wireless AP's 102 by using the wireless signal information transmitted from the user terminals 104.

The specific method of estimating distances between the wireless AP's 102 will be described later on.

According to another embodiment of the invention, a wireless AP map can also be constructed at the user terminals 104, by having the user terminals 104 within a particular area share the wireless signal information. For example, in the case of a particular building, the particular area can be defined to include the residential spaces of several people owning user terminals 104. In this case, the users within the particular area can share the wireless signal information collected by their respective user terminals 104. Thus, the user terminals 104 can use the shared wireless signal information to construct a wireless AP map for the entire space of that particular area.

Figure 2:
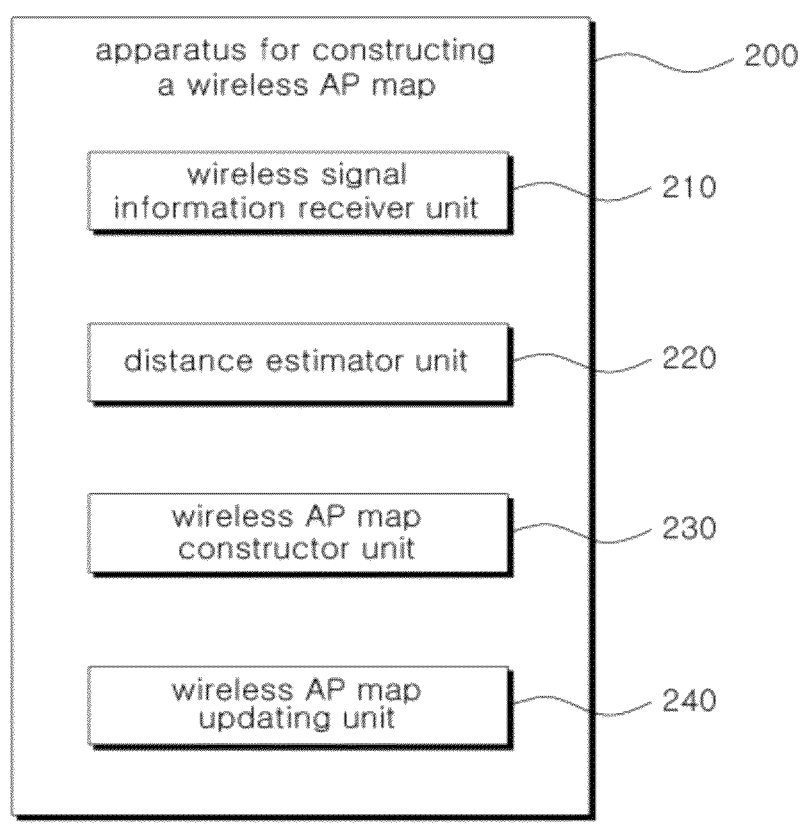
FIG. 2 is a block diagram showing the detailed composition of an apparatus for constructing a wireless AP map according to an embodiment of the invention.

FIG. 2 is a block diagram showing the detailed composition of an apparatus for constructing a wireless AP map according to an embodiment of the invention. Each component will be described below in terms of its function.

Referring to FIG. 2, an apparatus 200 for constructing a wireless AP map may include a wireless signal information receiver unit 210, a distance estimator unit 220, a wireless AP map constructor unit 230, and a wireless AP map updating unit 240.

Although the following descriptions focus mainly on examples in which the wireless AP map construction is performed at a server 100, it will be appreciated by the skilled person that the wireless AP map construction can also be performed at the user terminals 104, as described above, by sharing wireless signal information. The wireless signal information receiver unit 210 may receive from the user terminals 104 the wireless signal information collected by the user terminals 104 from the wireless AP's.

The distance estimator unit 220 may, using the wireless signal information collected from the user terminals 104, estimate the distances between wireless AP's 102 within a preset range.

According to an embodiment of the invention, the distance estimator unit 220 can estimate the distances using signal strengths from the wireless AP's 102 included in the wireless signal information.

The wireless AP map constructor unit 230 may construct a wireless AP map by using the estimated distances between wireless AP's 102.

The wireless AP map updating unit 240 may update the wireless AP map, when wireless signal information is received that allows more accurate distance estimation after a preset duration of time or after the user terminals 104 have moved.

Figure 3:
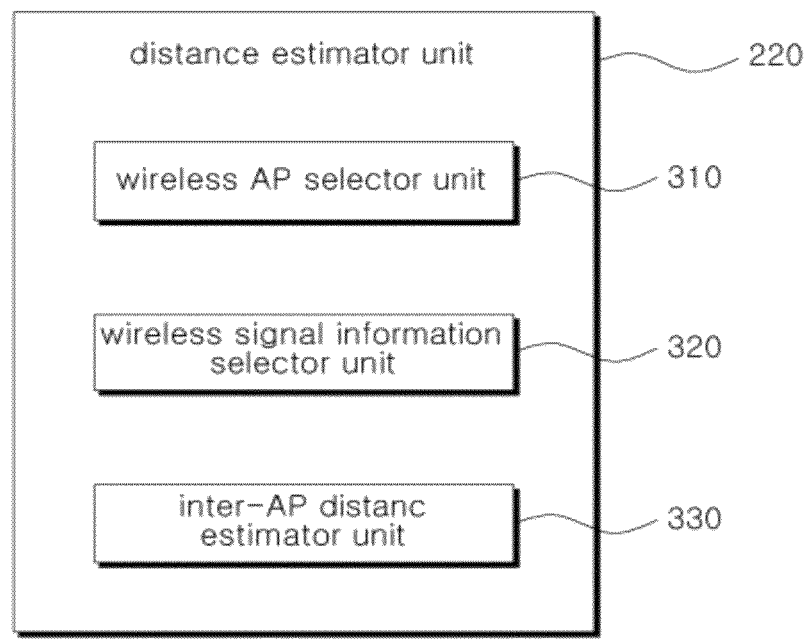
FIG. 3 is a block diagram showing the detailed composition of a distance estimator unit according to an embodiment of the invention.

FIG. 3 is a block diagram showing the detailed composition of a distance estimator unit according to an embodiment of the invention. Each component will be described below in terms of its function.

The distance estimator unit 220 may include a wireless AP selector unit 310, a wireless signal information selector unit 320, and an inter-AP distance estimator unit 330.

The wireless AP selector unit 310 may arbitrarily select wireless AP's for which to estimate distance, from among the wireless AP's 102 within a preset range. When selecting the wireless AP's 102, the wireless AP selector unit 310 may select the wireless AP's 102 such that the distances between all of the wireless AP's 102 can be estimated. For convenience, the following descriptions will assume that the wireless AP's selected by the wireless AP selector unit 310 are a first wireless AP 102-1 and a second wireless AP 102-2.

The wireless signal information selector unit 320 may select wireless signal information for estimating the distance between the first wireless AP 102-1 and the second wireless AP 102-2 selected by the wireless AP selector unit 310.

That is, the wireless signal information selector unit 320 may select the wireless signal information for estimating the distance between the first wireless AP 102-1 and the second wireless AP 102-2 selected by the wireless AP selector unit 310, from among the multiple sets of wireless signal information received from multiple user terminals 104.

Using the selected wireless signal information, the inter-AP distance estimator unit 330 may estimate the distance between the first wireless AP 102-1 and the second wireless AP 102-2.

The method of selecting wireless signal information and the method of estimating distance from the wireless signal information will be described below in more detail.

First, a description will be provided on a method of estimating distance from the wireless signal information.

Figure 4:
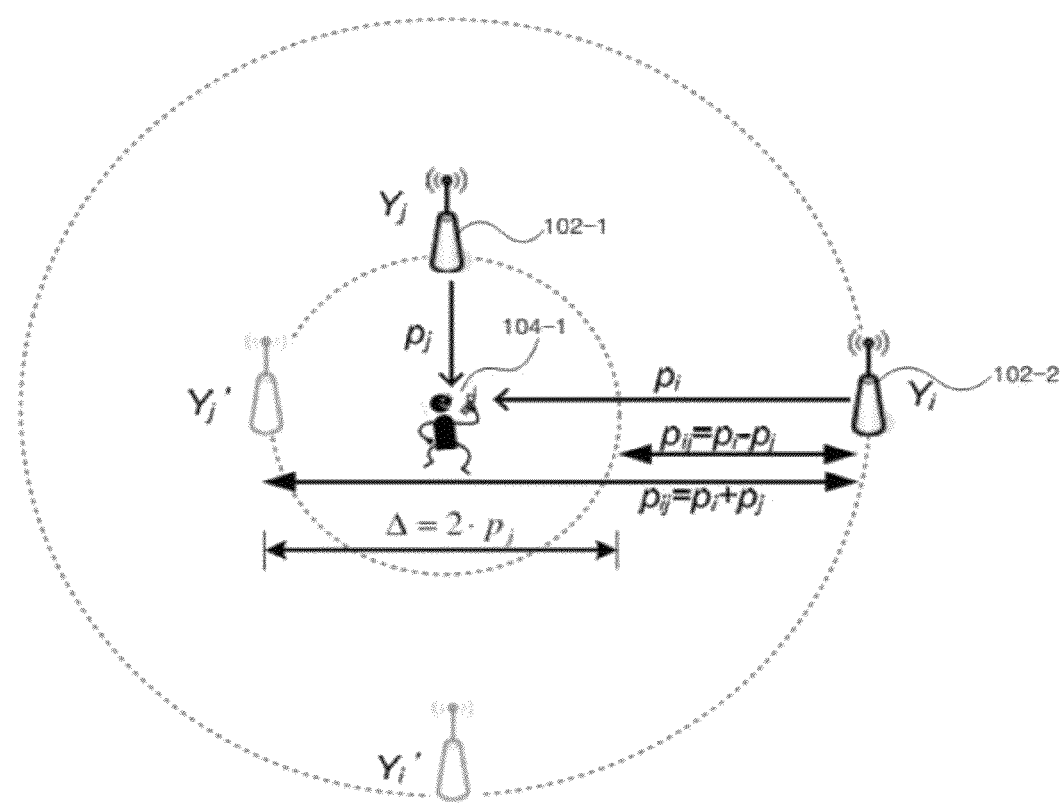
FIG. 4 illustrates a user terminal collecting wireless signal information from two wireless AP's according to an embodiment of the invention.

FIG. 4 illustrates a user terminal collecting wireless signal information from two wireless AP's according to an embodiment of the invention.

Referring to FIG. 4, the first user terminal 104-1 may collect wireless signal information from the first wireless AP 102-1 and the second wireless AP 102-2. Here, pj is the estimated distance between the first user terminal 104-1 and the first wireless AP 102-1 that is estimated by using the wireless signal information collected from the first wireless AP 102-1 by the first user terminal 104-1, pi is the estimated distance between the first user terminal 104-1 and the second wireless AP 102-2 that is estimated by using the wireless signal information collected from the second wireless AP 102-2 by the first user terminal 104-1, and pij is the estimated distance between the first wireless AP 102-1 and the second wireless AP 102-2 that is estimated by using pj and pi.

Here, the estimated distance between a wireless AP 102 and the user terminal 104 can be obtained by using the signal strength included in the wireless signal information. The greater the value of the signal strength, the smaller the value of the estimated distance between the user terminal 104 and the wireless AP 102, and the smaller the value of the signal strength, the greater the value of the estimated distance between the user terminal 104 and the wireless AP 102.

According to an embodiment of the invention, the distance between the user terminal 104 and the wireless AP 102 and the signal strength can be expressed by the following Equation 2.

$$Pr = P0 - 10n \log 10(d/10) + X\sigma \quad \text{[Equation 2]}$$

Here, Pr is a signal strength received from a wireless AP at an r-th user terminal, P0 is the signal strength at a point separated by a reference distance 10 from a wireless AP, n is a path loss exponent, Xσ is shadow noise, and d is the distance between the user terminal 104 and the wireless AP 102.

From Equation 2, it can be seen that there is an exponential relationship between the estimated distance and signal strength. In other words, the lower the strength of the signal, the greater the amount of increase of the estimated distance.

Also, according to an embodiment of the invention, the estimated distance between the user terminal 104 and the wireless AP 102 can be determined by classifying sections of signal strengths collected from the user terminal 104 into levels. For example, if the signal strength from the wireless AP 102 has a value between −20 dBm and −90 dBm, then the range can be classified into levels according to sections as in the following Equation 3.

$$-55 \text{ dBm} \leq Pr \leq -20 \text{ dBm:Level 1}$$

$$-70 \text{ dBm} \leq Pr \leq -55 \text{ dBm:Level 2}$$

$$-80 \text{ dBm} \leq Pr \leq -70 \text{ dBm:Level 3}$$

$$-85 \text{ dBm} \leq Pr \leq -80 \text{ dBm:Level 4}$$

$$-90 \text{ dBm} \leq Pr \leq -85 \text{ dBm:Level 5} \quad \text{[Equation 3]}$$

Here, Level 1 can mean setting the estimated distance to 1, Level 2 can mean setting the estimated distance to 2, Level 3 can mean setting the estimated distance to 3, Level 4 can mean setting the estimated distance to 4, Level 5 can mean setting the estimated distance to 5, so as to determine the estimated distance between the user terminal 104 and the wireless AP 102 according to the level of signal strength.

The wireless signal information received from the first wireless AP 102-1 at the first user terminal 104-1 may not include directional information of the first wireless AP 102-1. Thus, the position of the wireless AP can be positioned at a point on a circle having a radius of pj. Likewise, the second wireless AP 102-2 can also be positioned on a point on a circle having a radius of pi.

Therefore, the estimated distance between the first wireless AP 102-1 and the second wireless AP 102-2 may have a value within a range of pij=pi−pj and pij=pi+pj, and the average value of all possible values within this range can be the estimated distance between the first wireless AP 102-1 and the second wireless AP 102-2. In other words, the estimated distance can be the average of distances between the first and the second wireless AP's 102-1, 102-2 at all points at which the first wireless AP 102-1 and second wireless AP 102-2 can be positioned.

Here, the error range of the estimated distance has a value of Δ=2·pj, and the magnitude of the error of the estimated distance is proportional to the magnitude of pj.

Thus, if there are a multiple number of user terminals 104 receiving wireless signals from the first wireless AP 102-1 and the second wireless AP 102-2, a method of reducing the error of the estimated distances may be to estimate the distance between the first wireless AP 102-1 and second wireless AP 102-2 after selecting the wireless signal information of the user terminal having the largest value of received signal strength from the first wireless AP 102-1 or the second wireless AP 102-2. This will be described in further detail with reference to FIG. 5.

Figure 5:
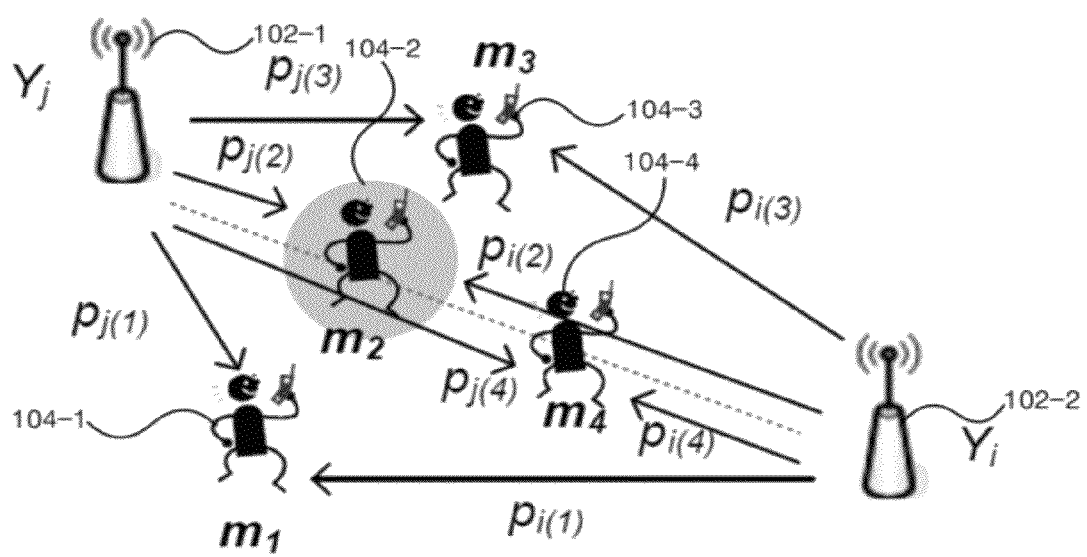
FIG. 5 illustrates a plurality of user terminals collecting wireless signal information from two wireless AP's according to an embodiment of the invention.

FIG. 5 illustrates a plurality of user terminals collecting wireless signal information from two wireless AP's according to an embodiment of the invention.

Referring to FIG. 5, a first user terminal 104-1, a second user terminal 104-2, a third user terminal 104-3, and a fourth user terminal 104-4, located at different positions, may collect wireless signal information from the first wireless AP 102-1 and second wireless AP 102-2.

Here, pj(n) is the estimated distance between the n-th user terminal and the first wireless AP 102-1, and pi(n) is the estimated distance between the n-th user terminal and the second wireless AP 102-2.

First, consider the case where the distance between the first wireless AP 102-1 and the second wireless AP 102-2 is estimated by using the wireless signal information of the second user terminal 104-2 and the third user terminal 104-3. If it is assumed that pj(1) is equal to pj(3) while pi(1) is greater than pi(3), then estimating the distance using the wireless signal information of the third user terminal 104-3 would yield a lower error rate than estimating the distance using the wireless signal information of the second user terminal 104-2. In other words, estimating the distance using the wireless signal information of the user terminal having a lower value of pj(n)+pi(n) can provide a lower error rate for the estimated distance.

If the distance between the first wireless AP 102-1 and the second wireless AP 102-2 are to be estimated using the wireless signal information of a first user terminal 104-1 and a fourth user terminal 104-4, which have similar values of pj(n)+pi(n), then selecting the user terminal having the lowest value of pj(n) or pi(n) can provide a lower error rate for the estimated distance. In other words, the estimated distance between a user terminal 104 and a wireless AP 102 is inversely proportional to the received signal strength. Therefore, estimating the distance by using the wireless signal information of the user terminal having the largest value of received signal strength from the first wireless AP 102-1 or the second wireless AP 102-2 may be a method of reducing the error rate in estimated distance.

In the foregoing example, if pj(2) has a smaller value than pi(4), then the wireless signal information selector unit 320 may select the wireless signal information of the first user terminal 104-1.

Referring again to FIG. 3, a description will be provided on the detailed composition of the distance estimator unit 220.

As described above, the wireless signal information selector unit 320 may select the wireless signal information of the first user terminal 104-1, which has the largest value of received signal strength from the first wireless AP 102-1 or the second wireless AP 102-2, from among the multiple number of user terminals 104.

The inter-AP distance estimator unit 330 may, using the signal strength from the first wireless AP 102-1 included in the wireless signal information of the first user terminal 104-1, estimate a first distance between the first user terminal 104-1 and the first wireless AP. The inter-AP distance estimator unit 330 may also estimate a second distance between the first user terminal 104-1 and the second wireless AP 102-2, by using the signal strength from the second wireless AP 102-2 included in the wireless signal information of the first user terminal 104-1. Then, using the first distance and second distance, the distance between the first wireless AP 102-1 and the second wireless AP 102-2 may be estimated.

Here, the inter-AP distance estimator unit 330 may estimate the first distance based on the assumption that the first wireless AP 102-1 is positioned on a first circle that is centered at the first user terminal 104-1 and has a radius equal to the first distance. Also, the inter-AP distance estimator unit 330 may estimate the second distance based on the assumption that the second wireless AP 102-2 is positioned on a second circle that is centered at the first user terminal 104-1 and has a radius equal to the second distance.

According to an embodiment of the invention, the inter-AP distance estimator unit 330 can determine the estimated distance between the first wireless AP 102-1 and the second wireless AP 102-2 to be the average value of distances between the first and second wireless AP's 102-1, 102-2 for all possible points at which the first and second wireless AP's 102-1, 102-2 can be positioned on the first and second circles.

According to an embodiment of the invention, if the two wireless AP's selected by the wireless signal information selector unit 320 is so far apart that there are no user terminals 104 that collect wireless signal information from both wireless AP's simultaneously, then the distance can be estimated by a method of finding the shortest path by using the positional relationships between wireless AP's obtained previously.

The wireless AP map constructor unit 230 may, using the distances estimated as above, construct a wireless AP map. The wireless AP map thus constructed may be updated by the wireless AP map updating unit 240, when wireless signal information is received that allows more accurate distance estimation after a preset duration of time or after the user terminals 104 have moved.

That is, the wireless AP map updating unit 240 can reconstruct a wireless AP map after re-estimating the distances between multiple wireless AP's 102 by using the wireless signal information newly received at the wireless signal information receiver unit 210 in preset intervals. Also, if after a movement of the user terminals 104, wireless signal information is received that includes a signal strength greater than the signal strength of the first wireless AP or second wireless AP included in the previously selected wireless signal information, then the wireless AP map updating unit 240 can reconstruct the wireless AP map by using this wireless signal information.

Figure 6:
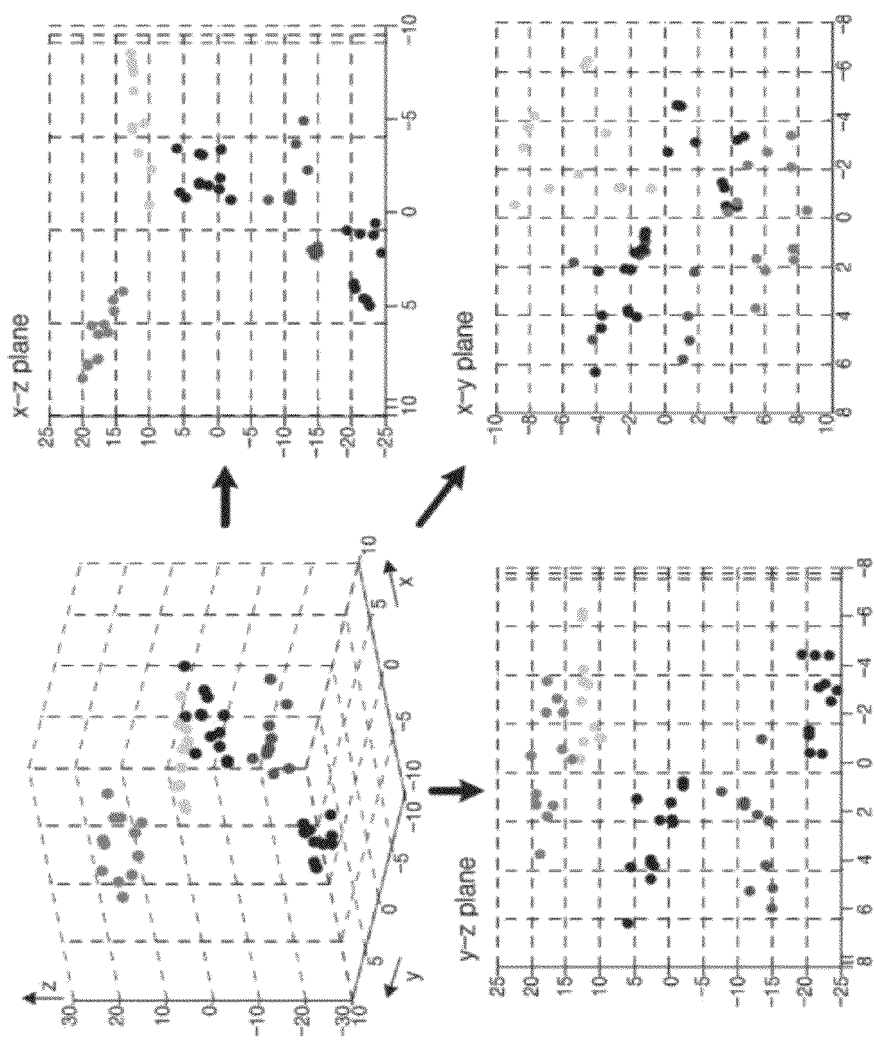
FIG. 6 illustrates an example of a wireless AP map constructed according to an embodiment of the invention.

FIG. 6 illustrates an example of a wireless AP map constructed according to an embodiment of the invention.

The wireless AP map constructor unit 230 can construct a wireless AP map not only in 2-dimensional space but also in 3-dimensional space.

For example, in cases where the wireless signal information receiver unit 210 collects wireless signal information from multiple wireless AP's positioned in an N-story building, the distance estimator unit 220 may estimate the distances between the multiple wireless AP's.

Then, the wireless AP map constructor unit 230 may extract 3-dimensional coordinates (x, y, z) of each of the multiple wireless AP's by applying 3-dimensional multi-dimensional scaling (MDS) to the estimated distances between the multiple wireless AP's. Thus, the wireless AP map constructor unit 230 can construct a wireless AP map in 3-dimensional space by using the respective 3-dimensional coordinates of the wireless AP's.

Here, by performing clustering for the multiple wireless AP's into N groups based on the z-coordinates, a wireless AP map can be constructed for each story.

According to an embodiment of the invention, the accuracy of 3-dimensional coordinates for each of the wireless AP's obtained by 3-dimensional multi-dimensional scaling can be lower than the accuracy of 2-dimensional coordinates obtained by 2-dimensional multi-dimensional scaling. Thus, it can be desirable to apply 2-dimensional multi-dimensional scaling for an N number of groups to re-construct a wireless AP map in 2-dimensional space for each story.

Referring to FIG. 6, FIG. 6 illustrates an example of constructing a wireless AP map for a 5-story building, the dots representing 2-dimensional wireless AP maps for different stories. From the wireless AP map having five groups plotted in the y-z plane, it can be seen that a wireless AP map is constructed in 3-dimensional space.

Figure 7:
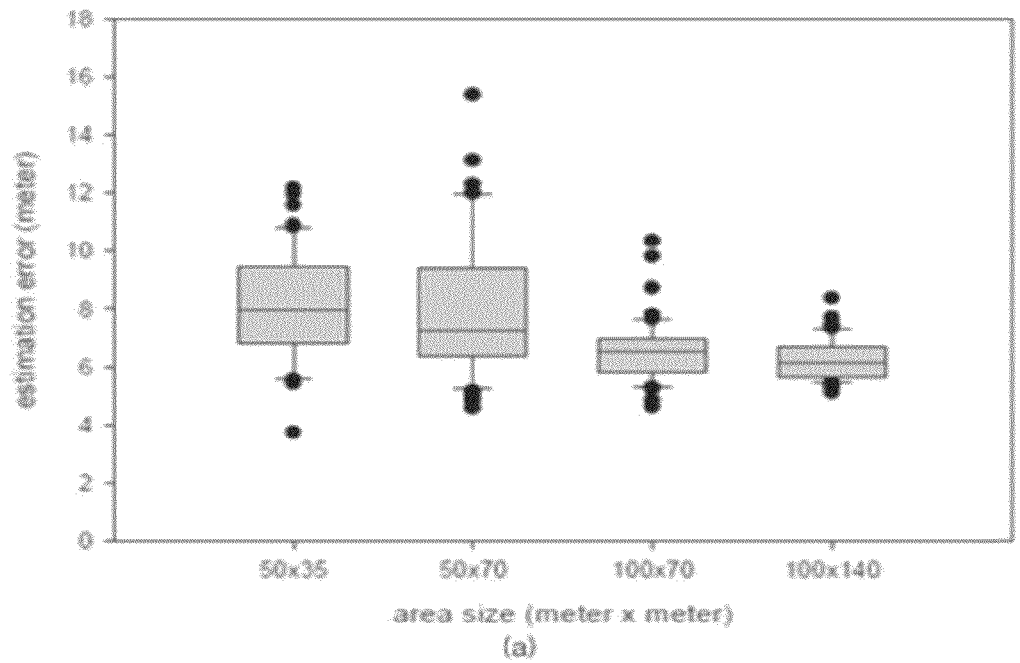
FIG. 7 illustrates error rates in position estimation of wireless AP's according to the size of a particular area and the number of wireless AP's, according to an embodiment of the invention.
Figure 7:
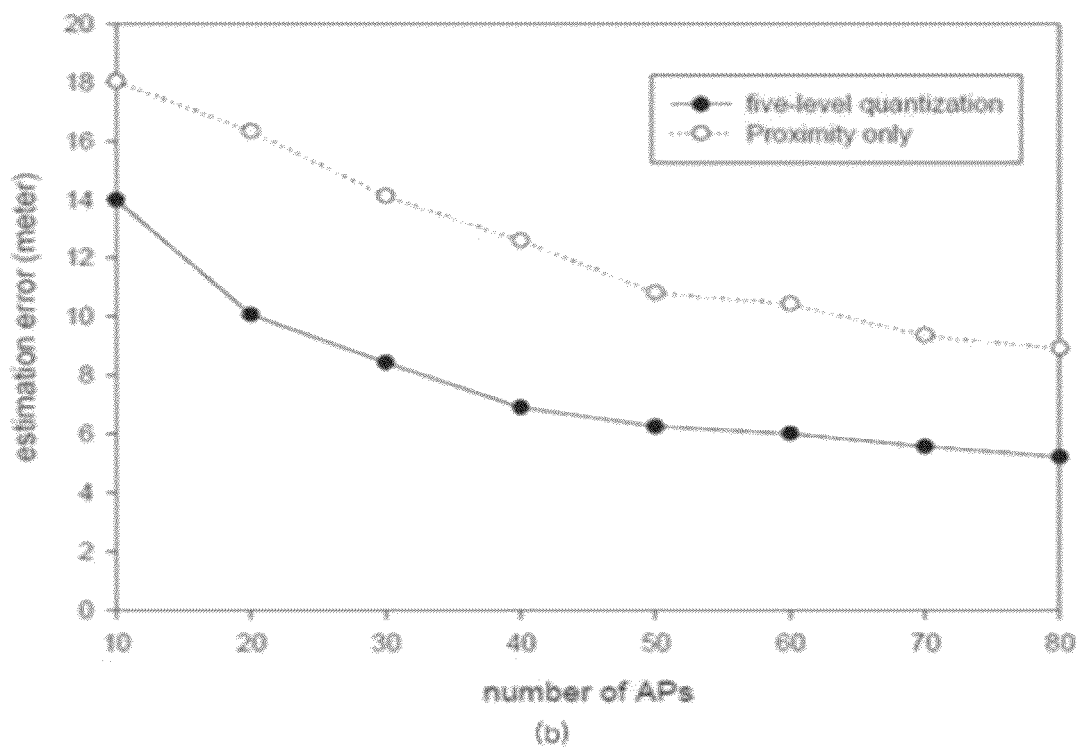

FIG. 7 illustrates error rates in position estimation of wireless AP's according to the size of a particular area and the number of wireless AP's, according to an embodiment of the invention.

Referring to FIG. 7($a$), it can be seen that the larger the size of the particular area for which the wireless AP map is constructed, the smaller the difference between the positions of the wireless AP's on the wireless AP map and the actual positions of the wireless AP's.

Referring to FIG. 7($b$), the greater the number of wireless AP's within the particular area, the smaller the difference between the positions of the wireless AP's on the wireless AP map and the actual positions of the wireless AP's. Also, it can be seen that during the calculation of the estimated distances between wireless AP's and user terminals, estimating the distances after classifying the received signal strengths into 5 levels results in smaller differences between the positions of the wireless AP's on the wireless AP map and the actual positions of the wireless AP's.

Figure 8:
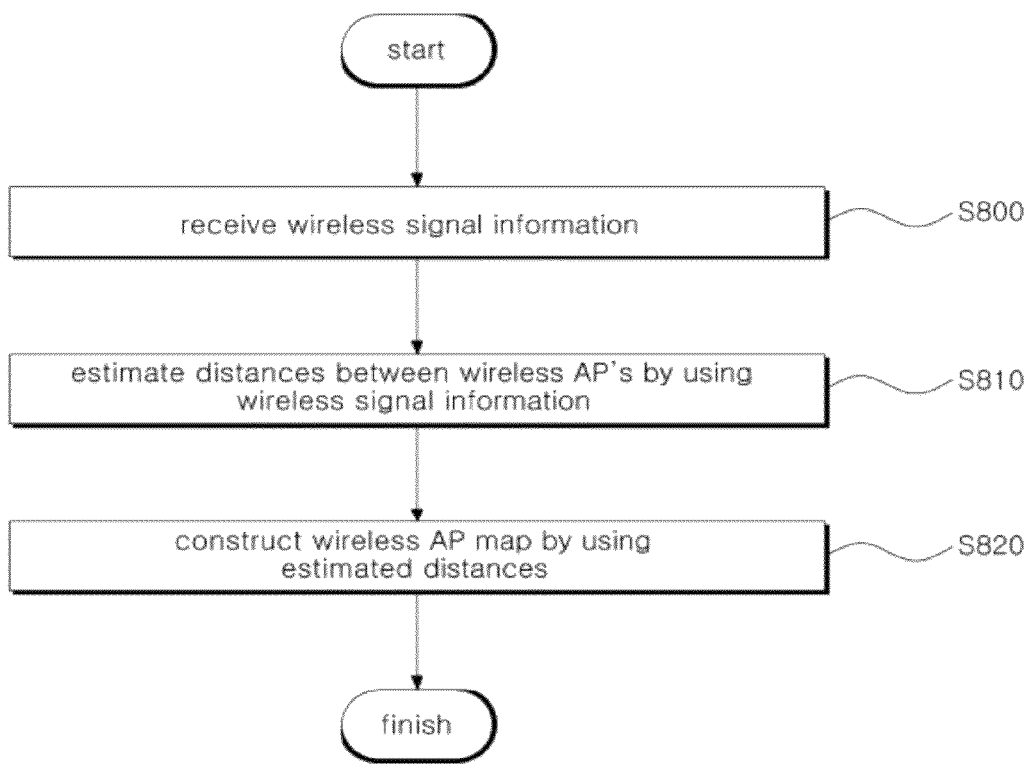
FIG. 8 is a flowchart showing an example of a method for constructing a wireless AP map according to an embodiment of the invention.

FIG. 8 is a flowchart showing an example of a method for constructing a wireless AP map according to an embodiment of the invention.

The wireless signal information receiver unit 210 may receive from the user terminals 104 the wireless signal information collected at each of the user terminals 104 (operation S800).

Then, the distance estimator unit 220 may select a first wireless AP 102-1 and a second wireless AP 102-2 from among the wireless AP's 102 and estimate the distance between the first wireless AP 102-1 and the second wireless AP 102-2 by using the wireless signal information of the user terminal having the largest received signal strength from the first wireless AP 102-1 or second wireless AP 102-2 from among the user terminals 104. By this method, the distance estimator unit 220 may estimate the distances between all of the wireless AP's 102 included in the particular area.

The wireless AP map constructor unit 230 may construct a wireless AP map including the position information of the wireless AP's 102, by using the estimated distances between the wireless AP's 102.

The descriptions above are directed at an embodiment of a method for constructing a wireless AP map according to the present invention, and the features of the apparatus 200 for constructing a wireless AP map described above with reference to FIGS. 2 to 7 can also be applied to the present embodiment. As such, the description of this embodiment will not be provided in further detail.

The embodiments of the invention can be implemented in the form of a program of instructions executable by various computer means and can be recorded on a computer-readable medium. The computer-readable medium can include a program of instructions, data files, data structures, etc., or a combination thereof The program of instructions recorded on the medium can be such that is especially designed for the present invention or is available to the skilled person in the computer software industry. Examples of a computer-readable recording medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the invention has been described above using particular items, such as specific elements, etc., and limited embodiments and drawings, these are merely provided to aid the overall understanding of the invention. The invention is not to be limited to the above embodiments, and those of ordinary skill in the art may conceive various modifications and alterations from the above disclosure. As such, the spirit of the invention is not to be defined only by the embodiments described above, and it is to be appreciated that not only the scope of claims set forth below but also their equivalents and substantially equivalent variations are encompassed within the spirit of the invention.

The invention claimed is:

1. A method for constructing a wireless AP (Access Point) map at a server connected over a network with a user terminal, the method comprising:
   receiving wireless signal information collected from each of a plurality of user terminals, the wireless signal information including a signal strength of each of a plurality of wireless AP's received by each user terminal;
   estimating a distance of each of the plurality of wireless AP's by using the wireless signal information; and
   constructing a wireless AP map by using the estimated distances,
   wherein the estimating the distance of each of the plurality of wireless AP's includes:
      selecting a first wireless AP and a second wireless AP from among the plurality of wireless AP's; and selecting wireless signal information for estimating a distance between the selected first wireless AP and the second wireless AP from among the wireless signal information, and
      using the selected wireless signal information to estimate the distance between the first wireless AP and the second wireless AP,
   wherein the estimating of the distance between the first wireless AP and the second wireless AP includes:
      selecting wireless signal information for a first user terminal from among the plurality of user terminals, the first user terminal having a largest value of received signal strength from the first wireless AP or the second wireless AP,
      estimating a first distance between the first user terminal and the first wireless AP by using a signal strength from the first wireless AP included in wireless signal information of the first user terminal,
      estimating a second distance between the first user terminal and the second wireless AP by using a signal strength from the second wireless AP included in wireless signal information of the first user terminal, and
      estimating the distance between the first and second wireless AP's by using the first distance and the second distance,
   wherein the estimating of the first distance includes assuming that the first wireless AP is positioned on a first circle having the first distance as a radius and the first user terminal as a center to estimate the first distance, the estimating of the second distance includes assuming that the second wireless AP is positioned on a second circle having the second distance as a radius and the first user terminal as a center to estimate the second distance,
   wherein the estimating of the distance between the first and second wireless AP's includes:
      determining the estimated distance between the first and second wireless AP's to be an average of distances between the first and the second wireless AP's at all points at which the first and the second wireless AP can be positioned on the first and the second circles.

2. The method of claim 1, wherein the estimating of the distance between the first and second wireless AP's includes:
   determining the estimated distance between the first and second wireless AP's to be an average of distances between the first and the second wireless AP's at all points at which the first and the second wireless AP can be positioned on the first and the second circles.

3. The method of claim 1, wherein the estimated first distance and second distance have smaller values for greater signal strengths from the first wireless AP and the second wireless AP.

4. The method of claim 3, wherein the estimated first distance or second distance is calculated using an equation as follows:

$$P_r = P_0 - 10n \log 10(d/l_0) + X\sigma$$

wherein $P_r$ is a signal strength received from a wireless AP at an r-th user terminal, $P_0$ is a signal strength at a point separated by a reference distance $l_0$ from a wireless AP, n is a path loss exponent, $X_\sigma$ is shadow noise, and d is a distance between an r-th user terminal and a wireless AP.

5. The method of claim 1, wherein a signal strength from the first wireless AP or the second wireless AP is classified into a level according to section, and a distance preset for the level is determined to be the first distance or the second distance.

6. The method of claim 1, further comprising:
   if second wireless signal information including a signal strength greater than a signal strength from the first wireless AP or the second wireless AP included in first wireless signal information of the first user terminal is received,
   re-estimating the distance between the first wireless AP and the second wireless AP by using the second wireless signal information, and updating the wireless AP map by using the re-estimated distance.

7. The method of claim 1, wherein the wireless AP map is constructed in a 2-dimensional or a 3-dimensional form.

8. The method of claim 1, wherein the wireless AP map is constructed using MDS (multi-dimensional scaling).

9. The method of claim 8, wherein, if the plurality of wireless AP's are positioned in a building having N stories (wherein N is a natural number), the constructing includes:
   extracting 3-dimensional coordinates (x, y, z) for each of the plurality of wireless AP's by applying MDS to the distances estimated between the plurality of wireless AP's, and constructing the wireless AP map in 3-dimensional space by using the 3-dimensional coordinates of each of the wireless AP's.

10. The method of claim 9, wherein the constructing includes:
    performing clustering into an N number of groups by using the z coordinates of the plurality of wireless AP's and applying 2-dimensional MDS for each of the N groups to reconstruct a wireless AP map in 2-dimensional space for each story.

11. A method for constructing a wireless AP (Access Point) map at a user terminal, the method comprising:
receiving wireless signal information collected from each of a plurality of user terminals, the plurality of user terminals connected over a network within a particular area, the wireless signal information including a signal strength of each of a plurality of wireless AP's received by each user terminal;
estimating a distance of each of the plurality of wireless AP's by using the wireless signal information; and
constructing a wireless AP map by using the estimated distances,
wherein the estimating the distance of each of the plurality of wireless AP's includes:
selecting a first wireless AP and a second wireless AP from among the plurality of wireless AP's; and
selecting wireless signal information for estimating a distance between the selected first wireless AP and the second wireless AP from among the wireless signal information and using the selected wireless signal information to estimate the distance between the first wireless AP and the second wireless AP,
wherein the estimating of the distance between the first wireless AP and the second wireless AP includes:
selecting wireless signal information for a first user terminal from among the plurality of user terminals, the first user terminal having a largest value of received signal strength from the first wireless AP or the second wireless AP;
estimating a first distance between the first user terminal and the first wireless AP by using a signal strength from the first wireless AP included in wireless signal information of the first user terminal;
estimating a second distance between the first user terminal and the second wireless AP by using a signal strength from the second wireless AP included in wireless signal information of the first user terminal; and
estimating the distance between the first and second wireless AP's by using the first distance and the second distance,
wherein the estimating of the first distance includes assuming that the first wireless AP is positioned on a first circle having the first distance as a radius and the first user terminal as a center to estimate the first distance, the estimating of the second distance includes assuming that the second wireless AP is positioned on a second circle having the second distance as a radius and the first user terminal as a center to estimate the second distance,
wherein the estimating of the distance between the first and second wireless AP's includes, determining the estimated distance between the first and second wireless AP's to be an average of distances between the first and the second wireless AP's at all points at which the first and the second wireless AP can be positioned on the first and the second circles.

12. An apparatus for constructing a wireless AP (Access Point) map, the apparatus comprising:
a wireless signal information receiver unit configured to receive wireless signal information collected from each of a plurality of user terminals, the wireless signal information including a signal strength of each of a plurality of wireless AP's received by each user terminal;
a distance estimator unit configured to estimate a distance of each of the plurality of wireless AP's by using the wireless signal information; and
a wireless AP map constructor unit configured to construct a wireless AP map by using the estimated distances, wherein the distance estimator unit comprises:
a wireless AP selector unit configured to select a first wireless AP and a second wireless AP from among the plurality of wireless AP's;
a wireless signal information selector unit configured to select wireless signal information for estimating a distance between the selected first wireless AP and the second wireless AP from among the wireless signal information; and
an inter-AP distance estimator unit configured to estimate the distance between the first wireless AP and the second wireless AP by using the selected wireless signal information,
wherein the wireless signal information selector unit selects wireless signal information for a first user terminal from among the plurality of user terminals, the first user terminal having a largest value of received signal strength from the first wireless AP or the second wireless AP, and the inter-AP distance estimator unit estimates a first distance between the first user terminal and the first wireless AP by using a signal strength from the first wireless AP included in wireless signal information of the first user terminal, estimates a second distance between the first user terminal and the second wireless AP by using a signal strength from the second wireless AP included in wireless signal information of the first user terminal, and estimates the distance between the first and second wireless AP's by using the first distance and the second distance,
wherein the inter-AP distance estimator unit estimates the first distance assuming that the first wireless AP is positioned on a first circle having the first distance as a radius and the first user terminal as a center to estimate the first distance, and estimates the second distance assuming that the second wireless AP is positioned on a second circle having the second distance as a radius and the first user terminal as a center to estimate the second distance,
wherein the inter-AP distance estimator unit determines the estimated distance between the first and second wireless AP's to be an average of distances between the first and the second wireless AP's at all points at which the first and the second wireless AP can be positioned on the first and the second circles.

13. The apparatus of claim 12, further comprising:
a wireless AP updating unit configured, if second wireless signal information including a signal strength greater than a signal strength from the first wireless AP or the second wireless AP included in first wireless signal information of the first user terminal is received, to re-estimate the distance between the first wireless AP and the second wireless AP by using the second wireless signal information and update the wireless AP map by using the re-estimated distance.

* * * * *